US008400749B2

(12) United States Patent
West et al.

(10) Patent No.: US 8,400,749 B2
(45) Date of Patent: Mar. 19, 2013

(54) AIRCRAFT JOINT AND BONDING LEAD

(75) Inventors: Colin John West, Bristol (GB); David Alistair Sutton, Bristol (GB)

(73) Assignee: Airbus Operations Limited, Bristol (GB)

(*) Notice: Subject to any disclaimer, the term of this patent is extended or adjusted under 35 U.S.C. 154(b) by 399 days.

(21) Appl. No.: 12/719,243

(22) Filed: Mar. 8, 2010

(65) Prior Publication Data
US 2010/0226062 A1 Sep. 9, 2010

(30) Foreign Application Priority Data

Mar. 9, 2009 (GB) .................................. 0904006.4
Mar. 9, 2009 (GB) .................................. 0904007.2
Oct. 29, 2009 (GB) .................................. 0918964.8
Oct. 29, 2009 (GB) .................................. 0918967.1

(51) Int. Cl.
*H05F 3/00* (2006.01)
(52) U.S. Cl. ........................ 361/218; 361/216
(58) Field of Classification Search .................. 361/218, 361/212, 216
See application file for complete search history.

(56) References Cited

U.S. PATENT DOCUMENTS

| 1,419,261 A | 6/1922 | Howard |
| 2,623,918 A | 12/1952 | Hartwell |
| 3,861,721 A * | 1/1975 | Berghofer ..................... 285/236 |
| 4,175,812 A | 11/1979 | Palmer |
| 4,573,016 A | 2/1986 | Nakamura et al. |
| 5,786,977 A | 7/1998 | Cohen |
| 5,973,903 A | 10/1999 | Tomerlin |
| 6,268,426 B1 | 7/2001 | Hirabayashi et al. |
| 7,547,228 B1 | 6/2009 | Schlarman |
| 2002/0142677 A1 * | 10/2002 | Hosaka et al. ................. 439/874 |
| 2003/0040215 A1 | 2/2003 | Kleen |
| 2008/0078880 A1 | 4/2008 | Petit |
| 2008/0102660 A1 * | 5/2008 | Wittwer .......................... 439/100 |
| 2009/0256352 A1 * | 10/2009 | Petit et al. ................. 285/123.15 |

FOREIGN PATENT DOCUMENTS

| CN | 101412835 | 11/2008 |
| EP | 0975911 A1 | 2/2000 |
| EP | 1484245 A1 | 12/2004 |
| FR | 2679074 A1 | 1/1993 |
| GB | 2072348 A | 9/1981 |

(Continued)

OTHER PUBLICATIONS

Timothy Russell et al., "The use of carbon nanotubes to improve conductive elastomers," Sealing Technology, Nov. 2005, pp. 12-14.
UK Search Report for GB0904006.4 dated Jul. 8, 2009.
UK Search Report for GB0918967.1 dated Feb. 25, 2010.

(Continued)

*Primary Examiner* — Danny Nguyen
(74) *Attorney, Agent, or Firm* — Lowe Hauptman Ham & Berner LLP

(57) ABSTRACT

A joint on an aircraft, the joint comprising: a first component; a second component; and a bonding lead which provides an electrical pathway between the first and second components. The bonding lead comprises a conductive core and a sheath which covers a substantial length of the core and has a lower electrical conductivity than the core. The path of least electrical resistance between the first component and the core of the bonding lead comprises the sheath, typically with an electrical resistance between 50 k$\Omega$ and 50 M$\Omega$. By making the electrical resistance of the core much smaller than that of the sheath, the total resistance of the bonding lead remains substantially the same regardless of its length.

17 Claims, 3 Drawing Sheets

FOREIGN PATENT DOCUMENTS

| | | | |
|---|---|---|---|
| GB | 2295594 | A | 6/1996 |
| JP | 3047298 | A | 7/1989 |
| JP | 2002117914 | A | 10/2000 |
| WO | 98/48207 | A1 | 10/1998 |

OTHER PUBLICATIONS

UK Search Report for GB0904007.2 dated Jul. 9, 2009.
GB Search Report for 0918964.8 dated Mar. 25, 2010.

* cited by examiner

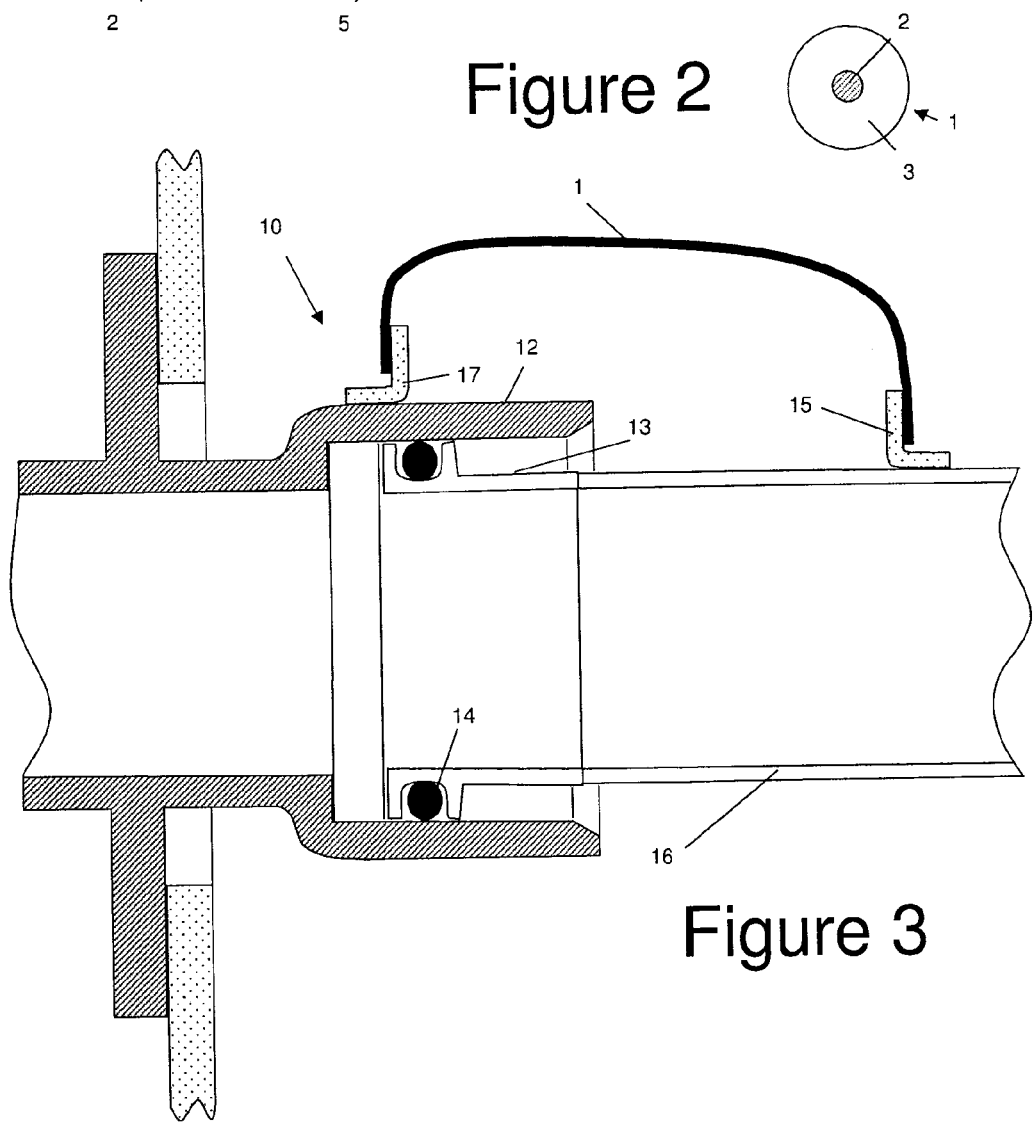

AIRCRAFT JOINT AND BONDING LEAD

RELATED APPLICATIONS

The present application is based on, and claims priority from British Application Number 0918967.1 filed Oct. 29, 2009, British Application Number 0918964.8 filed Oct. 29, 2009, British Application Number 0904007.2 filed Mar. 9, 2009 and British Application Number 0904006.4, filed Mar. 9, 2009, the disclosures of which are hereby incorporated by reference herein in their entirety.

FIELD OF THE INVENTION

The present invention relates to an aircraft joint, a bonding lead for use in such a joint, and a method of preventing sparking across such a joint.

BACKGROUND OF THE INVENTION

There is a risk in aircraft fuel systems of a build up of static electricity on one component in comparison to another component to which it is connected. In the prior art, a so-called bonding lead is connected to each side of the joint in order to electrically connect the components and prevent static build up. An example of such a bonding lead is described in the prior art section of US2008/0078880.

Bonding leads are traditionally made of highly conductive materials in different forms. These satisfy equipotential and electrostatic discharge requirements but allow the flow of lightning current across the joint. There is a risk that a break in such a bonding lead can result in intermittent contact and a source of sparking should high levels of electricity flow in the lead.

An example of this problem is shown in FIGS. 8 and 9. A bonding lead 42 couples a pair of fuel pipes 40, 41 across a joint between the pipes. The pipes are fitted within a fuel tank, close to a fuel tank wall 43. If the lead 42 breaks, the resulting two parts 42a, 42b will hang down as shown in FIG. 9 and there is a risk that one of the parts (in this case 42b) will make intermittent contact with the fuel tank wall 43.

One solution to this problem, described in the applicant's earlier application XA2907/XA2500 (GB patent application no. GB0904007.2) is to form the bonding lead from a material with a relatively low conductivity. This results in a relatively low flow of current which reduces the risk of sparking in the event of a lightning strike. However this solution requires the electrical conductivity of the material forming the bonding lead to be changed depending on the overall length of the bonding lead. This makes it difficult to provide bonding leads in different lengths which nevertheless lie within the desired resistance range.

SUMMARY OF THE INVENTION

A first aspect of the invention provides a joint on an aircraft, the joint comprising: a first component; a second component; and a bonding lead which provides an electrical pathway between the first and second components, the bonding lead comprising a conductive core and a sheath which covers a substantial length of the core and has a lower electrical conductivity than the core, wherein the path of least electrical resistance between the first component and the core of the bonding lead comprises the sheath.

A further aspect of the invention provides a method of preventing sparking across a joint on an aircraft, the method comprising conducting current across the joint by means of a bonding lead comprising a conductive core and a sheath, the sheath covering a substantial length of the core and having a lower electrical conductivity than the core, wherein substantially all of the current conducted by the bonding lead is carried along an electrical pathway which comprises the sheath in series with the core.

The bonding lead may be dissipate electrostatic charge across the joint and/or conduct lightning current across the joint.

A further aspect of the invention provides a method of assembling the joint of the first aspect of the invention, the method comprising:
  connecting the bonding lead to the first component by engaging the sheath with the first component; and
  connecting the bonding lead to the second component by engaging the sheath or the core with the second component.

The present invention uses the sheath to form part of the electrical pathway of the bonding lead. By making the electrical conductivity of the core much higher than that of the sheath, typically by a factor of more than 100, the total resistance of the bonding lead remains substantially the same regardless of its length.

One or both of the components in the joint may be a fuel pipe, a hydraulic pipe, an air pipe, a wall of a fuel tank, an access panel in a wall of a fuel tank, or any other part of an aircraft which is in contact with fuel when in use (in liquid or vapour form) or has the potential of doing so.

The second component may be connected directly to the core, but this is not preferred since if the bonding lead breaks then one half of the broken lead will have low resistance and thus may make intermittent contact as in FIG. 9. Therefore more preferably the path of least electrical resistance between the second component and the core of the bonding lead also comprises the sheath.

Typically the sheath is formed from a material comprising a high-conductivity filler dispersed within a low-conductivity matrix. This enables the conductivity of the sheath to be easily controlled by varying the density of filler. Preferably the matrix comprises an elastomeric matrix.

Optionally the core may also be formed from a material comprising a high-conductivity filler dispersed within a low-conductivity matrix. Accordingly, a further aspect of the invention provides a bonding lead comprising an electrically conductive core; and a sheath covering a substantial length of the core and having a lower electrical conductivity than the core, wherein the sheath and the core are both formed from a material comprising a high-conductivity filler dispersed within a low-conductivity matrix, and the density of the high-conductivity filler is higher in the core than in the sheath.

Preferably the bonding lead provides an electrical pathway between the first and second components with a relatively high electrical resistance—typically between 100 k$\Omega$ and 10 M$\Omega$, preferably between 200 k$\Omega$ and 1 M$\Omega$, and most preferably between 200 k$\Omega$ and 500 k$\Omega$. Thus the electrical resistance of the path of least electrical resistance between the first component and the core of the bonding lead is selected accordingly (depending on whether the second component is connected directly to the core). Most typically the path of least electrical resistance between the first component and the core of the bonding lead has an electrical resistance higher than 50 k$\Omega$ and lower than 10 M$\Omega$.

A further aspect of the invention provides a bonding lead comprising an electrically conductive core; a sheath covering a substantial length of the core and having a lower electrical conductivity than the core; and a connection flange which is integrally formed with the sheath and formed from the same material as the sheath.

BRIEF DESCRIPTION OF THE DRAWINGS

Embodiments of the invention will now be described with reference to the accompanying drawings, in which:

FIG. 1 is a longitudinal sectional view of a bonding lead according to an embodiment of the invention;

FIG. 2 is an end view of the bonding lead;

FIG. 3 is a sectional view of a joint according to an embodiment of the invention;

DETAILED DESCRIPTION OF EMBODIMENT(S)

Figure 4:
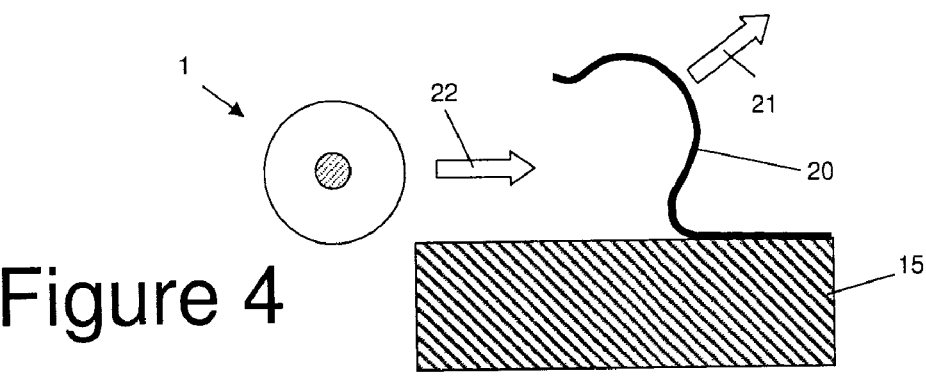
FIG. 4 is a sectional view showing a connection clip being pulled back and the bonding lead inserted.

FIGS. 1 and 2 show a bonding lead 1 comprising an electrically conductive core 2 and a sheath 3.

The core 2 may be formed from a variety of highly conductive materials: for instance a metal such as copper; carbon rope; lightweight carbon nanotube wiring; or an elastomer loaded with a conductive filler dispersed throughout the elastomer. Suitable elastomers include fluorosilicone and suitable fillers include carbon black or carbon nanotubes.

The sheath 3 is formed from an elastomer loaded with a conductive filler dispersed throughout the elastomer. Suitable elastomers include fluorosilicone and suitable fillers include carbon black or carbon nanotubes.

The core 2 and the sheath 3 may be formed from the same elastomeric matrix material and the same conductive filler (such as carbon nanotubes) but with the density of the conductive filler being higher in the core 2 than in the sheath 3.

The sheath 3 protects the core 2 and extends along its full length. The core 2 may be exposed at each end as shown in FIG. 1, or may be fully encapsulated by the sheath, including at both ends.

As well as protecting the core 2, the sheath 3 also minimises damage to surrounding structure due to impact with the bonding lead, as well as reducing fretting between any adjacent bonding leads, since the elastomeric material is relatively soft and thus less damaging than an unsheathed metallic bonding lead. The sheath 3 also reduces material compatibility issues between the bonding lead and the surrounding structure, for example galvanic corrosion.

FIG. 3 shows a fuel pipe joint 10 on an aircraft. The joint comprises a socket 12, in which a pipe end fitting 13 is located, an O-ring seal 14 sealing the contact between the socket and the pipe end fitting, and a connection tab 15 welded to the fuel pipe 16 connected to the pipe end fitting 13. A further connection tab 17 is machined on the socket 12 and the bonding lead 1 is arranged between the two connection tabs 15, 17 to provide an electrical pathway connecting one side of the joint to the other.

The bonding lead 1 is designed to form an electrical connection between the connection tabs 15, 17 with a relatively high electrical resistance–between 100 kΩ and 10 MΩ, or more typically between 200 kΩ and 500 kΩ.

This is achieved by suitable selection of the following parameters:
 the density of conductive filler in the sheath
 the thickness of the sheath Note that the conductivity of the material forming the sheath is much lower than the conductivity of the metal core (typically by a factor of more than 100) but also much higher than the conductivity of conventional electrical cable sheaths.

Figure 5:
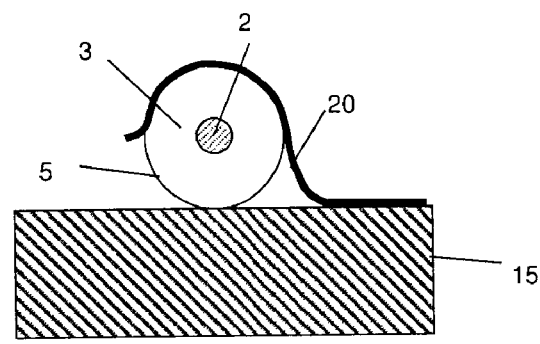
FIG. 5 is a sectional view showing the clip clamping the bonding lead against a connection tab.
Figure 6:
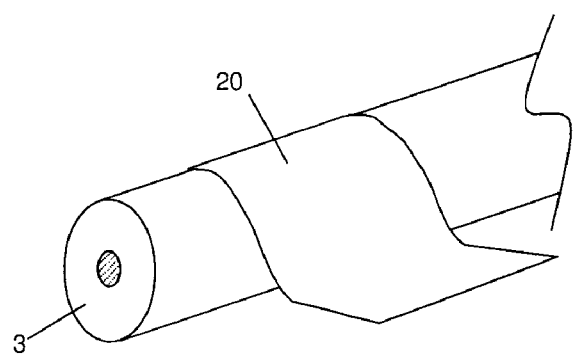
FIG. 6 is a perspective view of the arrangement of FIG. 5 but with the tab omitted.

FIG. 4 is a sectional view showing how the bonding lead 1 is attached to the connection tab 15. A similar connection arrangement is provided between the bonding lead and the other tab 17. A resilient clip 20 is bolted to the tab by a bolt (not shown) and pulled back as indicated by arrow 21 so the lead 1 can be pushed into place as shown by arrow 22. The clip 20 is then released and springs back into place, clamping the outer surface 5 of the sheath to the tab 15 as shown in FIG. 5. FIG. 6 is a perspective view which shows the clip 20 but omits the tab 15.

The clip 20 may be formed from metal, or a non-conducting material. Optionally the sheath 3 may be formed with a series of annular grooves, spaced apart along the length of the cable, each groove having a width approximately the same as the width of the clip 20. The clip 20 can then be received in the groove to prevent the bonding lead from slipping lengthwise relative to the clip.

In contrast with a conventional connection with a sheathed electrical cable (in which the sheath is removed to enable a low resistance connection to be made with the conductive core) the path of least electrical resistance between the tab 15 and the core 2 is provided by the sheath 3. The same arrangement is present at the other end of the cable, so the path of least resistance between the tabs 15 and 17 runs along the length of the core and through the sheath at both ends. As a result substantially all of the current conducted by the bonding lead is carried along a relatively high resistance electrical pathway which comprises the sheath at both ends in series with the core.

The bonding lead is provided on a roll, and any desired length of the lead can be cut from the roll depending on the distance between the tabs 15, 17. Since the electrical resistance along the length of the core is negligible, the total resistance of the bonding lead between the tabs 15, 17 is approximately twice the resistance of the path across the sheath, regardless of the length of the lead.

Figure 7:
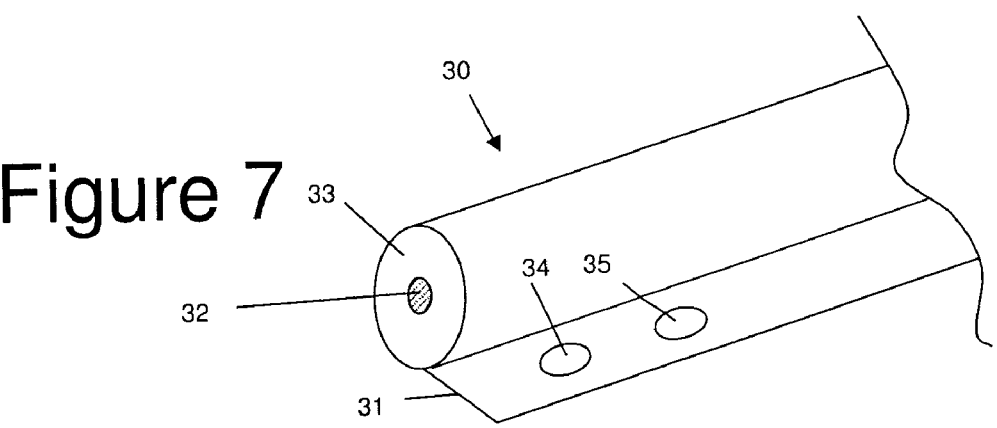
FIG. 7 is a perspective view showing a bonding lead according to a second embodiment of the invention.
Figure 8:
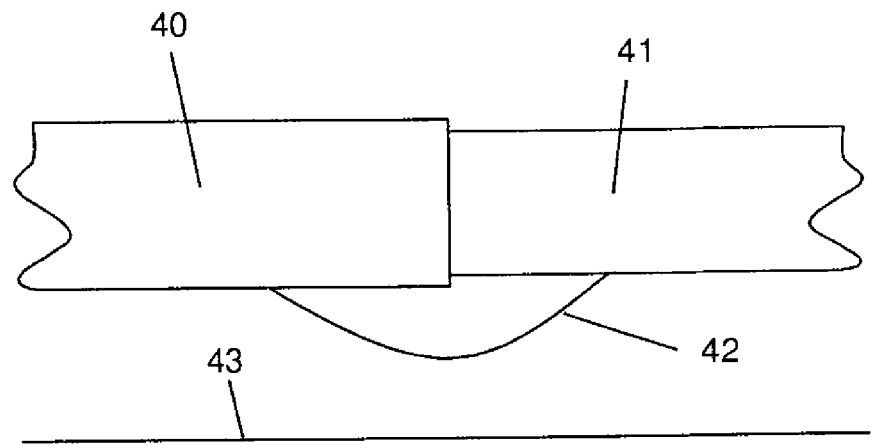
FIG. 8 is a side view of a conventional joint on an aircraft.

An alternative bonding lead 30 is shown in FIG. 7. The lead 30 is identical to the lead 1, the only difference being the provision of a connection flange 31 which is integrally moulded with the sheath 33 and formed from the same material. The flange 31 runs along the full length of the bonding lead. After a suitable length of cable has been cut from the roll, a pair of bolt holes 34, 35 is punched into the flange 31 at each end. Alternatively bolt holes may be preformed along the length of the flange. The flange 31 is attached to one of the connection tabs 15, 17 by bolts (not shown) which pass through the bolt holes 34, 35 and the tab 15, 17. The bolts are electrically conductive so as to form a low resistance connection between the tab 15, 16 and the flange 31.

In this case the path of least electrical resistance between each bolt and the core 32 comprises a first path across the flange between the bolt and the edge of the sheath 33, and a second path between the inner and outer surfaces of the sheath 33. Therefore the electrical conductivity of the sheath may need to be slightly higher than in the embodiment of FIGS. 1-6 to ensure that the total electrical resistance of the bonding lead falls within the correct range.

Figure 9:
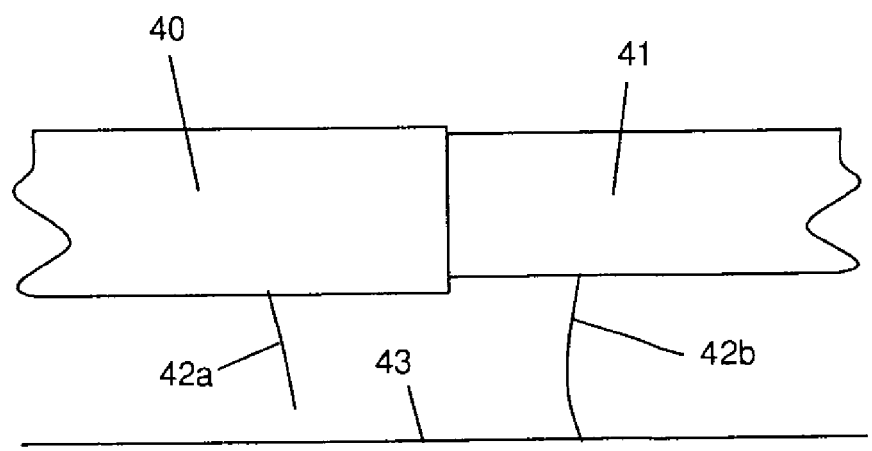
FIG. 9 shows the joint of FIG. 8 after the bonding lead has broken.

If either of the bonding leads 1, 30 breaks, resulting in one of the halves making intermittent contact with the fuel tank wall (as in FIG. 9), then the risk of sparking is mitigated by two factors:

the relatively high resistance of the bonding lead limits the current flow; and the fact that the metallic core is shielded along its length reduces the risk of intermittent contact compared with the case of an unshielded metal bonding lead as in FIG. 9.

Although the invention has been described above with reference to one or more preferred embodiments, it will be appreciated that various changes or modifications may be made without departing from the scope of the invention as defined in the appended claims.

The invention claimed is:

1. A joint on an aircraft, the joint comprising: a first component; a second component; and a bonding lead which provides an electrical pathway between the first and second components, the bonding lead comprising a conductive core and a sheath which covers a substantial length of the core and has a lower electrical conductivity than the core, wherein the path of least electrical resistance between the first component and the core of the bonding lead comprises the sheath.

2. The joint of claim 1 wherein the path of least electrical resistance between the second component and the core of the bonding lead also comprises the sheath.

3. The joint of claim 1 wherein the sheath and/or the core is formed from a material comprising a high-conductivity filler dispersed within a low-conductivity matrix.

4. The joint of claim 3 wherein the matrix comprises an elastomeric matrix.

5. The joint of claim 1 wherein the path of least electrical resistance between the first component and the core of the bonding lead has an electrical resistance higher than 50 kΩ.

6. The joint of claim 5 wherein the path of least electrical resistance between the first component and the core of the bonding lead has an electrical resistance higher than 100 kΩ.

7. The joint of claim 1 wherein the path of least electrical resistance between the first component and the core of the bonding lead has an electrical resistance lower than 10 MΩ.

8. The joint of claim 7 wherein the path of least electrical resistance between the first component and the core of the bonding lead has an electrical resistance lower than 1 MΩ.

9. A method of assembling the joint of claim 1, the method comprising:

connecting the bonding lead to the first component by engaging the sheath with the first component; and connecting the bonding lead to the second component by engaging the sheath or the core with the second component.

10. The method of claim 9 wherein the bonding lead is connected to the second component by engaging the sheath with the second component.

11. A method of preventing sparking across a joint on an aircraft, the method comprising conducting current across the joint by means of a bonding lead comprising a conductive core and a sheath, the sheath covering a substantial length of the core and having a lower electrical conductivity than the core, wherein substantially all of the current conducted by the bonding lead is carried along an electrical pathway which comprises the sheath in series with the core.

12. A bonding lead comprising an electrically conductive core; a sheath covering a substantial length of the core and having a lower electrical conductivity than the core; and a connection flange which is integrally formed with the sheath and formed from the same material as the sheath, wherein the connection flange is configured to be attachable to a component to provide an electrical connection between the connection flange and the component.

13. A bonding lead comprising an electrically conductive core; a sheath covering a substantial length of the core and having a lower electrical conductivity than the core; and a connection flange which is integrally formed with the sheath and formed from the same material as the sheath, wherein the flange runs along the full length of the bonding lead.

14. A bonding lead comprising an electrically conductive core; and a sheath covering a substantial length of the core and having a lower electrical conductivity than the core, wherein the sheath and the core are both formed from a material comprising a high-conductivity filler dispersed within a low-conductivity matrix, and the density of the high-conductivity filler is higher in the core than in the sheath.

15. The bonding lead of claim 14 wherein the sheath and the core are both formed from a material comprising a high-conductivity filler dispersed within a low-conductivity elastomeric matrix.

16. The bonding lead of claim 14 wherein the matrix in the core and the matrix in the sheath are formed from substantially the same material.

17. The bonding lead of claim 14 wherein the high-conductivity filler in the core and the high-conductivity filler in the sheath are formed from substantially the same material.

* * * * *